United States Patent
Nordman et al.

(10) Patent No.: US 8,684,311 B2
(45) Date of Patent: Apr. 1, 2014

(54) BONDED SPLICE JOINT

(75) Inventors: Paul Nordman, Renton, WA (US); Paul Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 13/414,066

(22) Filed: Mar. 7, 2012

(65) Prior Publication Data

US 2013/0233973 A1 Sep. 12, 2013

(51) Int. Cl.
 *B64C 1/06* (2006.01)
(52) U.S. Cl.
 USPC ....................................................... 244/131
(58) Field of Classification Search
 USPC ......... 244/131, 132, 119, 123.1, 123.2, 123.7
 See application file for complete search history.

(56) References Cited

U.S. PATENT DOCUMENTS

| | | | |
|---|---|---|---|
| 5,242,523 A * | 9/1993 | Willden et al. | 156/285 |
| 5,951,800 A | 9/1999 | Pettit | |
| 7,574,835 B2 | 8/2009 | Bohlmann | |
| 7,578,473 B2 | 8/2009 | Shortman | |
| 7,686,251 B2 | 3/2010 | Tanner et al. | |
| 7,837,148 B2 | 11/2010 | Kismarton et al. | |
| 8,302,909 B2 * | 11/2012 | Cazeneuve et al. | 244/120 |
| 8,371,529 B2 * | 2/2013 | Tacke et al. | 244/119 |
| 8,505,851 B2 * | 8/2013 | Noebel et al. | 244/158.1 |
| 2007/0051851 A1 | 3/2007 | Ruffin | |
| 2009/0200425 A1 | 8/2009 | Kallinen et al. | |
| 2010/0181428 A1 * | 7/2010 | Noebel et al. | 244/131 |
| 2010/0258676 A1 * | 10/2010 | Gauthie et al. | 244/131 |
| 2010/0272954 A1 * | 10/2010 | Roming et al. | 428/138 |
| 2010/0282905 A1 * | 11/2010 | Cazeneuve et al. | 244/120 |
| 2011/0042519 A1 * | 2/2011 | Tacke et al. | 244/131 |
| 2011/0095130 A1 * | 4/2011 | Luettig | 244/119 |
| 2011/0284693 A1 | 11/2011 | Barnard | |

FOREIGN PATENT DOCUMENTS

| | | |
|---|---|---|
| EP | 2032432 B1 | 7/2010 |
| RU | 1037539 A1 | 9/1996 |

OTHER PUBLICATIONS

PCT International Search Report and Written Opinion of the International Searching Authority (European Patent Office, Rijswijk, Netherlands) in a corresponding PCT application, published Mar. 22, 2013.

* cited by examiner

*Primary Examiner* — Philip J Bonzell
(74) *Attorney, Agent, or Firm* — Ostrager Chong Flaherty & Broitman P.C.

(57) ABSTRACT

A method and apparatus for an aircraft structure. In one embodiment, the aircraft structure may have first and second stringers, each having a vertical stringer portion defining a lengthwise gap. The embodiment may include a cruciform fitting having a central rib attachment member and first and second extensions extending in opposite directions from said central rib attachment member. Stringer attachment portions extending up from said first and second extensions are inserted into the lengthwise gaps of the first and second stringer portions, respectively. The rib attachment member may be attached to a side-of-body rib.

20 Claims, 7 Drawing Sheets

BONDED SPLICE JOINT

TECHNICAL FIELD

This disclosure relates generally to aircraft structures and in particular to an aircraft side-of-body joint.

BACKGROUND

In manufacturing of an aircraft, aerodynamic structures such as wing panels are joined to the fuselage or to other structures of the aircraft. In some traditional joints, butt joints or splice joints are used in which a portion of the wing may be butted up to, or spliced with, a portion of the fuselage and joined using bolts, rivets and devices such as ribs and so forth. In these traditional joints, the bolts and ribs of the joint are used to meet the load requirements for the joint. Thus, sufficient bolts and other mechanical fastening devices must be used to meet the bearing allowable for the material used in the aircraft construction.

Mechanical joints, particularly those with many bolts, may be very heavy which corresponds to more aircraft weight and increased operational cost. Further, production cost associated with mechanical joints may be significant because the joints are formed separately from the joined panels which takes up production time (labor, equipment and so forth) and the joints include many different parts (ribs, bolts and so forth) which must also be fabricated. In addition, bolted joints may experience fatigue over the long term and accordingly must be inspected periodically, maintained and replaced, further increasing operational costs. Thus, although desirable results have been achieved using traditional joints for aerodynamic structures, there is room for improvement.

SUMMARY

It is an object of the present disclosure to provide a side-of-body joint having reduced weight and manufacturing costs. It is a further object of the present disclosure to provide a side-of-body joint to which a continuous skin section may be coupled.

In accordance with these and other objects, advantage may be obtained by employing a bonded joint which does not use discontinuous skin sections joined at a side-of-body rib, but rather uses a continuous skin section which is bonded to various portions of the wing.

In accordance with a first embodiment, a side-of-body joint assembly is provided, comprising first and second t-shaped stringers, each having a horizontal stringer portion and a vertical stringer portion extending up from said horizontal stringer portion, said vertical stringer portion defining a lengthwise gap having an opening at said horizontal stringer portion; and a cruciform fitting having a central rib attachment member and first and second t-shaped fitting extensions extending in opposite directions from said central rib attachment member, each fitting extension having a horizontal fitting portion and a stringer attachment portion extending up from said horizontal fitting portion; said stringer attachment portions of said first and second t-shaped fitting extensions being inserted into said lengthwise gap of said first and second t-shaped stringers, respectively.

In accordance with a second embodiment, a side-of-body joint assembly coupled to a rib web having a plurality of vertical stiffeners is provided, said side-of-body joint assembly comprising: first and second t-shaped stringers, each having a horizontal stringer portion and a vertical stringer portion extending up from said horizontal stringer portion, said vertical stringer portion defining a lengthwise gap having an opening at said horizontal stringer portion; and a cruciform fitting having a central rib attachment member and first and second t-shaped fitting extensions extending in opposite directions from said central rib attachment member, each fitting extension having a horizontal fitting portion and a stringer attachment portion extending up from said horizontal fitting portion; said stringer attachment portions of said first and second t-shaped fitting extensions being inserted into said lengthwise gap of said first and second t-shaped stringers, respectively; said central rib attachment member being coupled to said rib web.

In accordance with a third embodiment, an aircraft having a side-of-body joint is provided, said side-of-body joint comprising: a rib web; and a plurality of side of body joint assemblies arranged side by side, each side of body joint assembly comprising: first and second t-shaped stringers, each having a horizontal stringer portion and a vertical stringer portion extending up from said horizontal stringer portion, said vertical stringer portion defining a lengthwise gap having an opening at said horizontal stringer portion; and a cruciform fitting having a central rib attachment member and first and second t-shaped fitting extensions extending in opposite directions from said central rib attachment member, each fitting extension having a horizontal fitting portion and a stringer attachment portion extending up from said horizontal fitting portion; said stringer attachment portions of said first and second t-shaped fitting extensions being inserted into said lengthwise gap of said first and second t-shaped stringers, respectively; each of said central rib attachment members of said plurality of side of body joint assemblies being coupled to said rib web.

Other objects, features and advantages will be apparent when the detailed description of the preferred embodiments is considered in conjunction with the drawings.

BRIEF DESCRIPTION OF THE DRAWINGS

Reference will now be made to the drawings, in which similar elements in different drawings bear the same reference numerals.

DETAILED DESCRIPTION OF THE DRAWINGS

The present disclosure relates to side-of-body joints which may be present in aerodynamic structures such as composite wings and tails. Many specific details of certain embodiments of such side-of-body joints are set forth in the following description and in FIGS. 1-4B to provide a thorough understanding of such embodiments. One skilled in the art, however, will understand that the present disclosure may have additional embodiments, or that embodiments of the present disclosure may be practiced without several of the details according to the following description. For instance, while certain embodiments reference composite wing structures for an aircraft, it may be appreciated by those of skill in the art that the techniques described may be applied in a variety of aerodynamic structures.

One exemplary location of a side-of-body joint occurs where a wing meets a fuselage in an aircraft. Such an exemplary location is depicted in detail in FIG. 1, which illustrates an aircraft 100 in accordance with an embodiment of the present invention. The aircraft 100 includes a fuselage 102 which is joined to a composite wing structure 104. The composite wing structure 104 includes three portions: two wing portions 106, 108 extending laterally outward from the fuselage 102, and center portion 110 spanning the fuselage 102. The three portions 106, 108, 110 define three associated coordinate systems, one for each of the wing portions 106, 108 and another for the center portion 110. It is noted that certain features of aircraft 100 are omitted for clarity. For instance, the wing portions 106, 108 may be coupled to a leading edge portion, trailing edge portion, wing tips and other members which are not shown.

Figure 1:
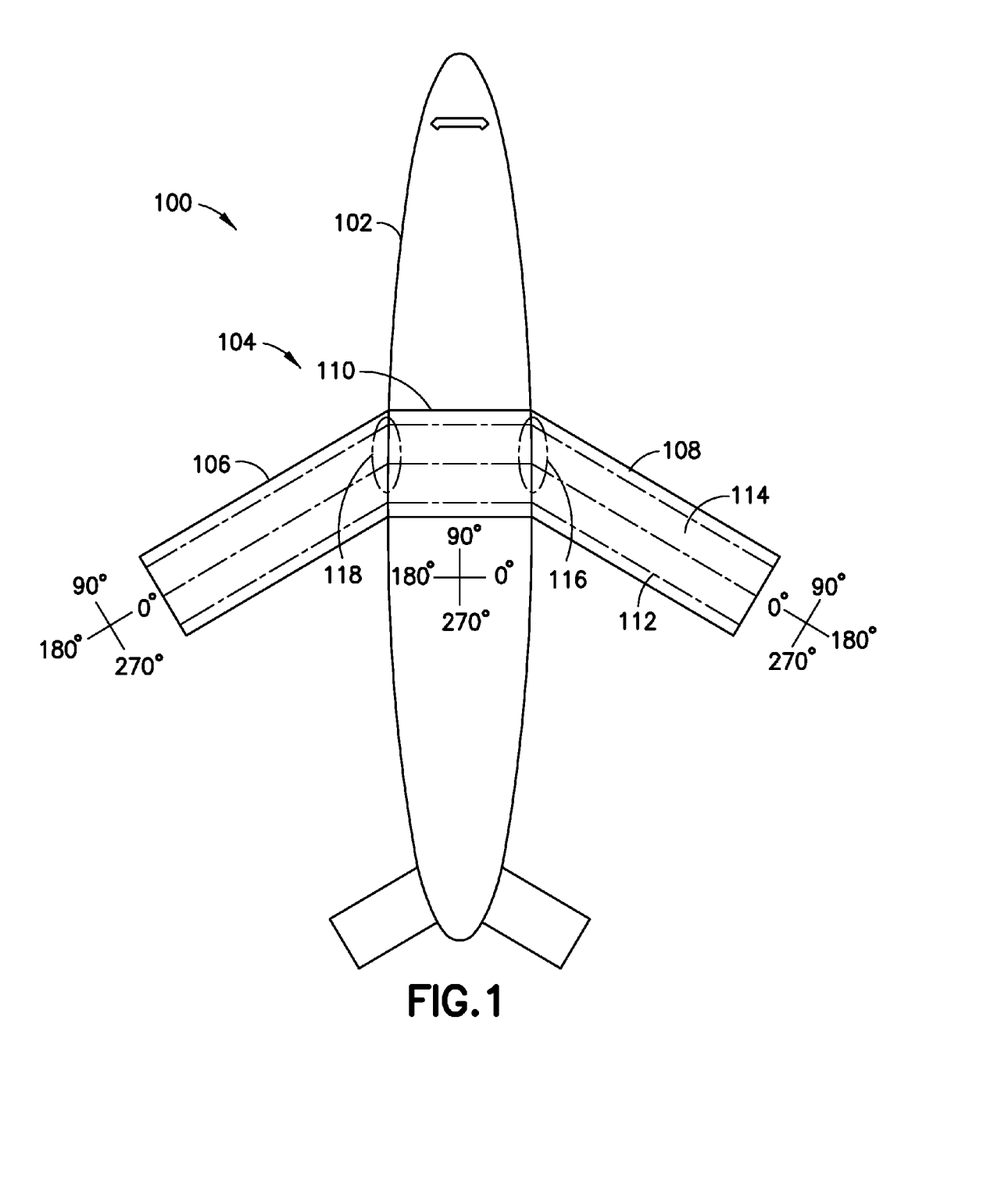
FIG. 1 is a schematic overhead view of an aircraft having a composite wing structure and side of body joints formed in accordance with an embodiment of the present disclosure.

The locations of side-of-body joints 116, 118 are illustrated coincident with each side of the fuselage 102 or body-line of the aircraft 100. These side-of-body joints 116, 118 occur where the composite wing structure 104 is joined to the fuselage 102. The side-of-body joints 116, 118 may be used to join a composite wing structure 104 or integrally-formed panel section to the fuselage 102. Alternatively, two wing portions 106, 108 may similarly be joined together with a central portion omitted 110. The center portion 110 is oriented to be substantially transverse to the longitudinal axis of the fuselage 102. The wing portions 106, 108 are depicted here as swept back in an approximately 30 degree sweep angle relative to the center portion 110. While a 30 degree sweep is illustrated in FIG. 1, it is noted that a variety of sweep angles, including a sweep angle of zero degrees, or even a forwardly swept sweep angle, may be employed. More particularly, it is contemplated that the techniques described herein may be employed to produce composite aerodynamic structures and/or wings with any desired sweep angles (rearwardly swept, forwardly swept, or no sweep), which in accordance with the inventive principles described herein have improved side-of-body joints of reduced weight and which may be utilized.

A plurality of structural members (e.g., stringers, spars, and ribs) forms a skeletal like structure (such as a framework) which is overlaid with composite material skin 114 to form the composite panel. In the depicted illustration, the positions of exemplary stringers are represented by lines 112 shown as running substantially along the length of the wings 106, 108 and across the center portion 110.

Figure 2A:
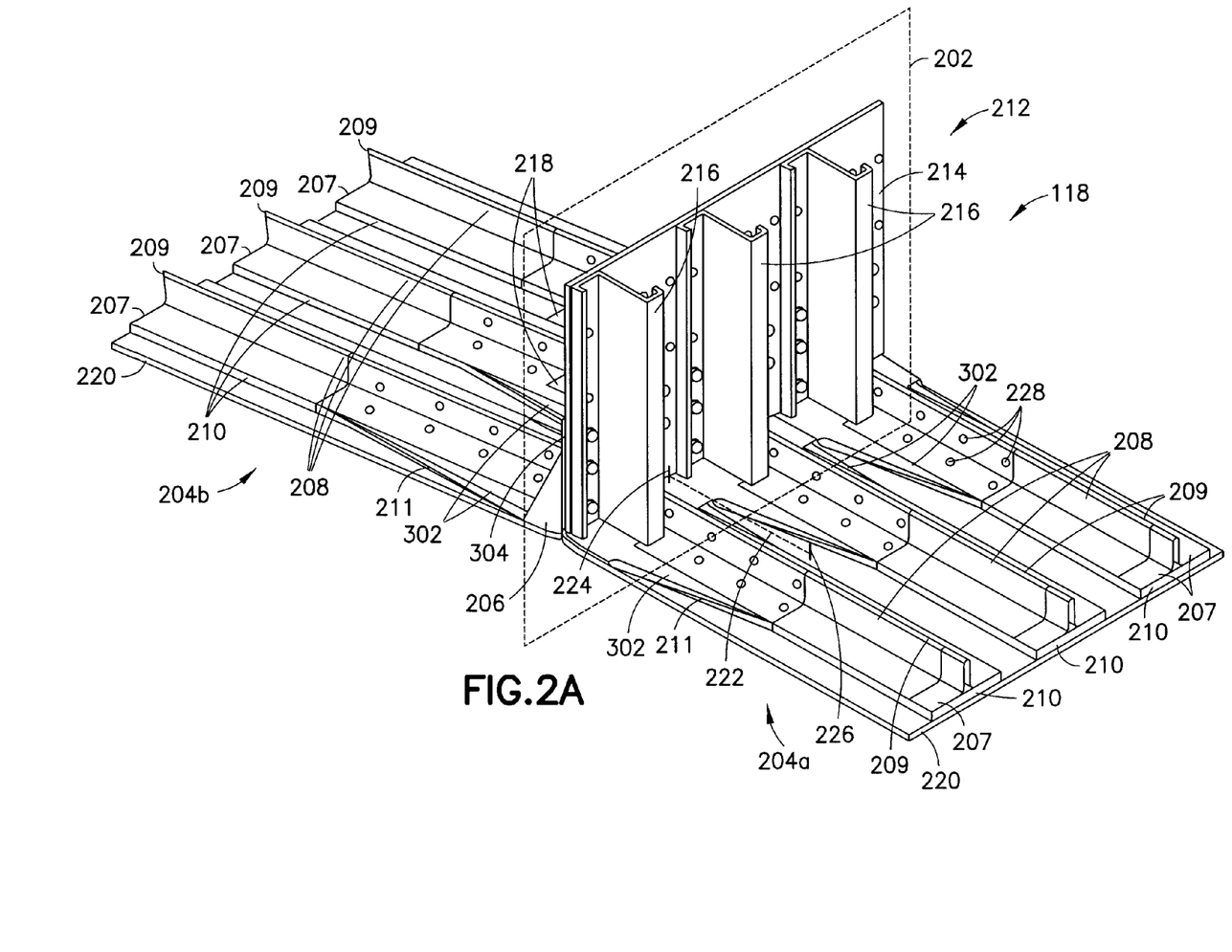
FIG. 2A is an isometric view of a side-of-body joint formed in accordance with an embodiment of the present disclosure.
Figure 2B:
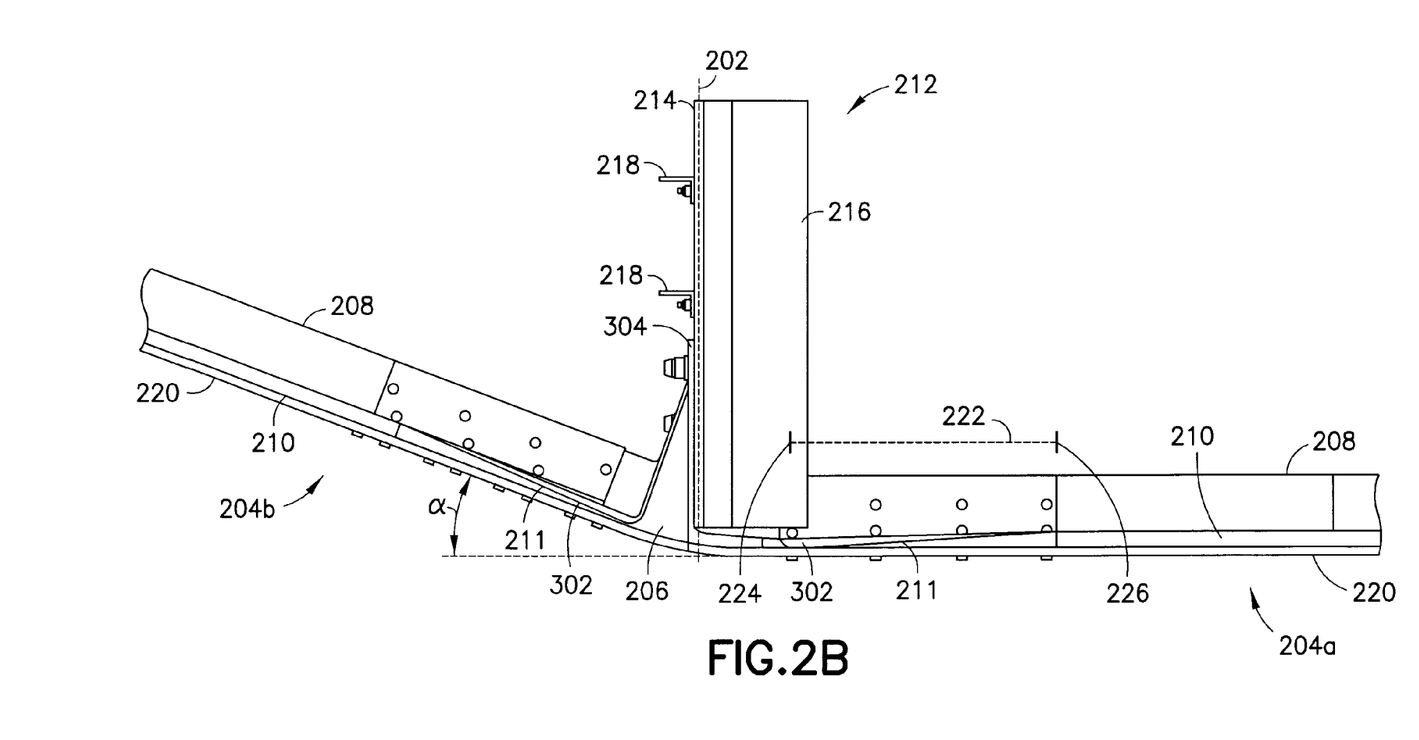
FIG. 2B is a side view of a side-of-body joint formed in accordance with an embodiment of the present disclosure.
Figure 2C:
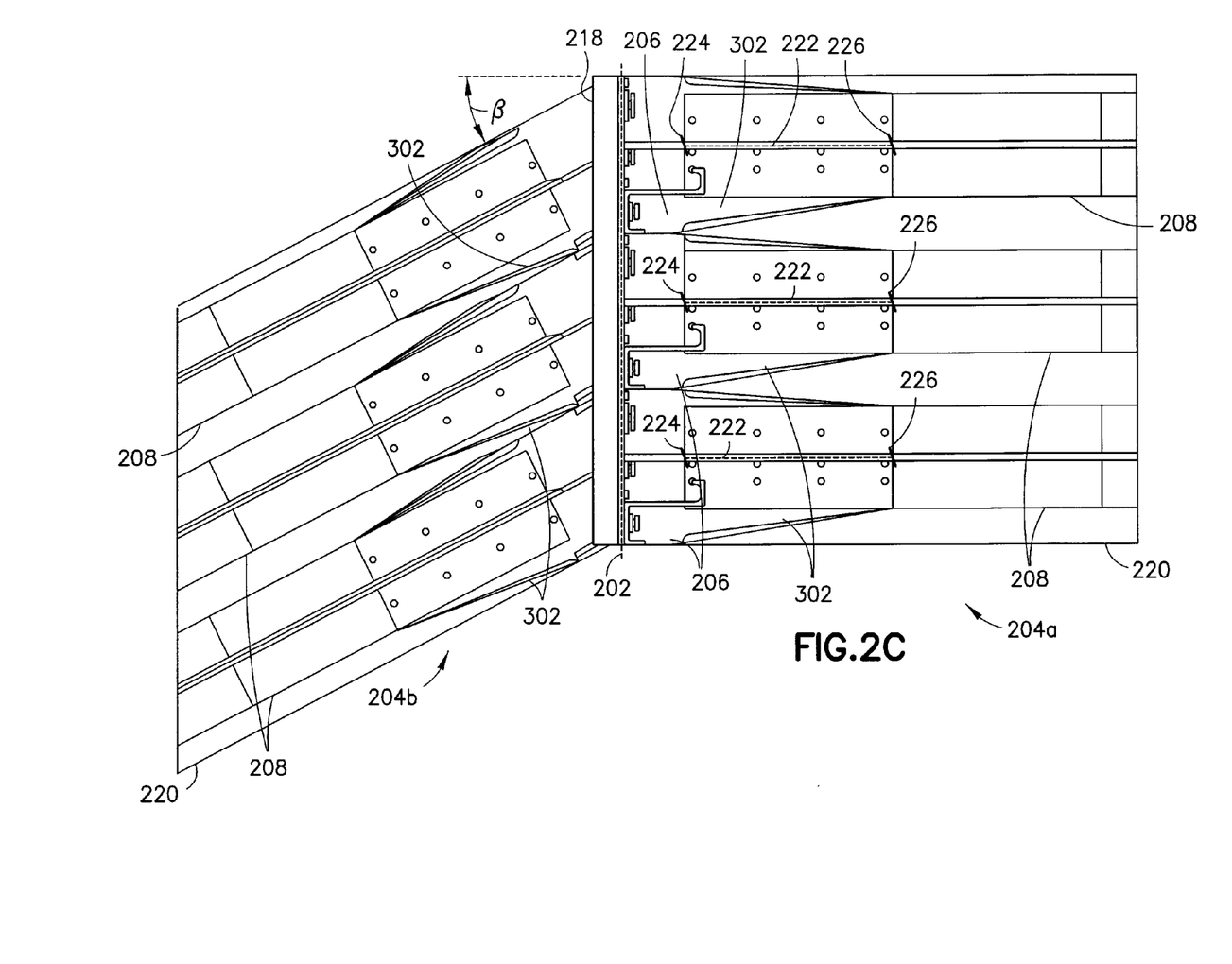
FIG. 2C is a top-down view of a side-of-body joint formed in accordance with an embodiment of the present disclosure.

The composition of the side-of-body joint 118 will now be described in more detail. FIGS. 2A-2C depict three different views of a portion of such a side-of-body joint 118. FIG. 2A is an isometric view, FIG. 2B is a side view and FIG. 2C is a top-down view. Side-of-body joint 118 occurs at the interface between the center portion 110 and the left wing portion 106 as depicted in FIG. 1. The interface is represented in FIGS. 2A-2C by 202. Center portion 110 and left wing portion 106 may be angled in two directions α and β with respect to each other. Angle α (seen in FIG. 2B) corresponds to the angle of the bottom surface of the wing as compared to a horizontal plane bisecting the aircraft, while angle β (seen in FIG. 2C) corresponds approximately to the sweep angle of the wing. FIGS. 2A-2C illustrate a lower portion of a joint 118 between a lower inboard portion 204a on the center portion side 110 of the joint 118 (e.g., inside the fuselage) and a lower outboard portion 204b on the wing 106 side of the joint 118 (e.g., outside of the fuselage). A similar joint implementation may be used on the upper portion of the left wing 106 (not depicted in this figure) and at the side-of-body joint 116 occurring at the interface between the center portion 110 and the right wing portion 108.

Side-of-body joint 118 is formed by joining left wing portion 106 and center portion 110 together at side-of-body rib 212 (also referred to herein as "rib" 212). The left wing portion 106 and center portion 110 each have lengthwise t-shaped stringer sections 208 and stringer bases 210 directly beneath the t-shaped stringer sections 208. The side-of-body rib 212 is positioned in a transverse direction to the length of the wing portion 106 and in a direction approximately parallel to the surface of the fuselage. Skin 220 covers both left wing portion 106 and center portion 110 and is continuous at the location of the joint 118. The stringer sections 208 and stringer bases 210 are joined to the rib 212 through the use of a plurality of cruciform fittings 206, which are coupled to the rib 212 and to the stringer sections 208 and stringer bases 210 as described in more detail below. The skin 220 is continuous and is coupled along the bottom surfaces of the cruciform fittings 206 and the stringer bases 210.

FIGS. 2A-2C depict three cruciform fittings 206 arrayed side-by-side, six t-shaped stringers 208 and six stringer bases 210. A set of one cruciform fitting 206, coupled to two t-shaped stringer sections 208 and two stringer bases 210 will be referred to herein as a "side-of-body joint assembly." Although three such side-of-body joint assemblies are depicted in FIGS. 2A-2C, any number may be utilized as required to form the joint.

Explanation of the side-of-body joint 118 will be made clearer by first explaining the composition of the various component parts, including stringer sections 208, stringer bases 210 and cruciform fittings 206.

Figure 3:
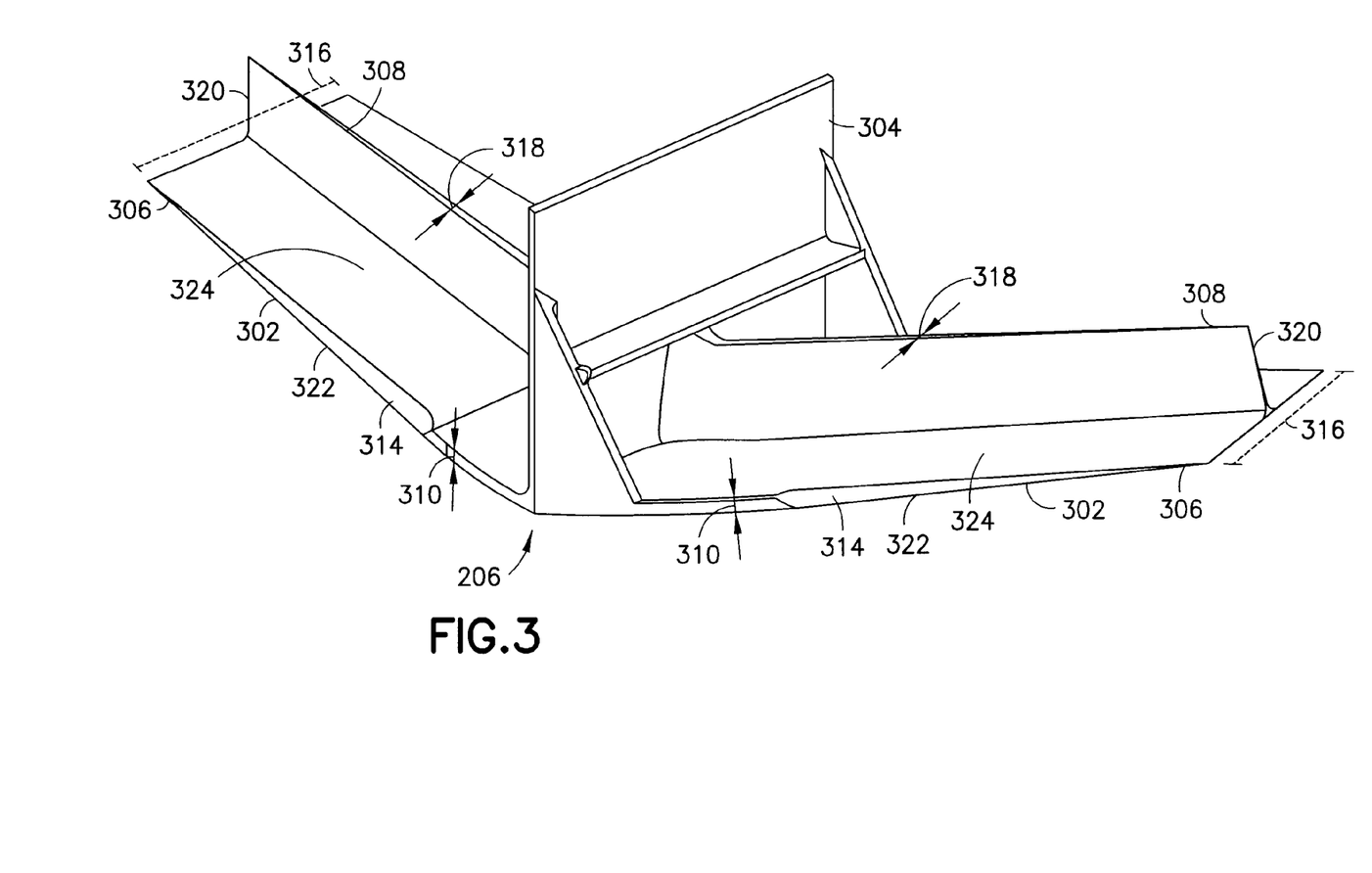
FIG. 3 is an isometric view of a cruciform fitting in accordance with an embodiment of the present disclosure.

FIG. 3 depicts a cruciform fitting 206 in more detail. The cruciform fitting 206 comprises two t-shaped fitting extensions 302 extending in opposite directions from a central rib attachment member 304. The central rib attachment member 304 is preferably sized to accommodate at least two rows of fasteners for connection with the rib 212. The cruciform fitting 206 is preferably made from a high strength to weight ratio metal such as Titanium. The two fitting extensions 302 may be angled with respect to each other in both a vertical direction α and a horizontal direction β, corresponding to the angles α and β in FIGS. 2A-2C. This pair of oppositely extending t-shaped fitting extensions 302 act as attachment points for stringer bases 210 and t-shaped stringers sections 208 on the two opposite sides of a side-of-body joint.

Each t-shaped fitting extension 302 has a horizontal fitting portion 306 and a vertical fitting portion 308 (also referred to herein as a "stringer attachment portion") extending up from the horizontal fitting portion 306. The thickness 310 of the horizontal fitting portion 306 and the thickness 318 of the vertical fitting portion 308 decreases from the central rib attachment member 304 towards a distal end 320 of the t-shaped fitting extension 302. Thus the extension 302 is thicker at a point close to the rib attachment member 304 than at a point close to the end 320 of the t-shaped fitting extension 302 to form gradually tapered surfaces.

The horizontal fitting portion 306 is tapered in two directions. First, due to the presence of diagonal edges 314, horizontal fitting portion 306 is tapered in a top to bottom direction—the width 316 of the horizontal fitting portion 306 is greater closer to a bottom surface 322 and smaller near a top surface 324 of the horizontal fitting portion 306. Second, the horizontal fitting portion 306 is tapered in a lengthwise direction—the horizontal fitting portion has a width 316 that is greater closer to the rib attachment member 304 and smaller towards the distal end 320 of the t-shaped fitting extension 302.

Figure 4A:
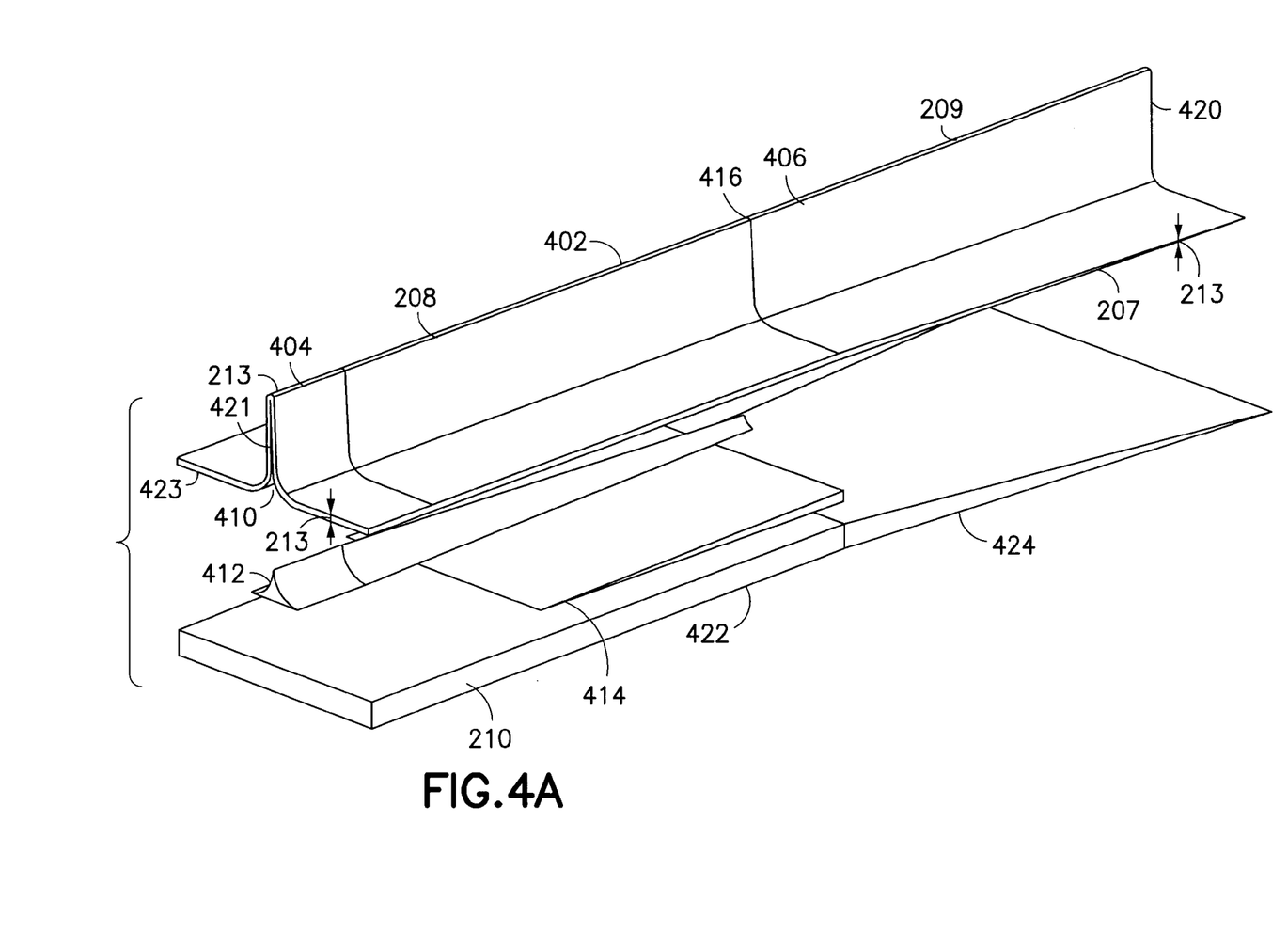
FIG. 4A is a first exploded isometric view of components of a side-of-body joint, including a stringer base, a t-shaped stringer section, a stringer noodle and a tapered filler, in accordance with an embodiment of the present disclosure.
Figure 4B:
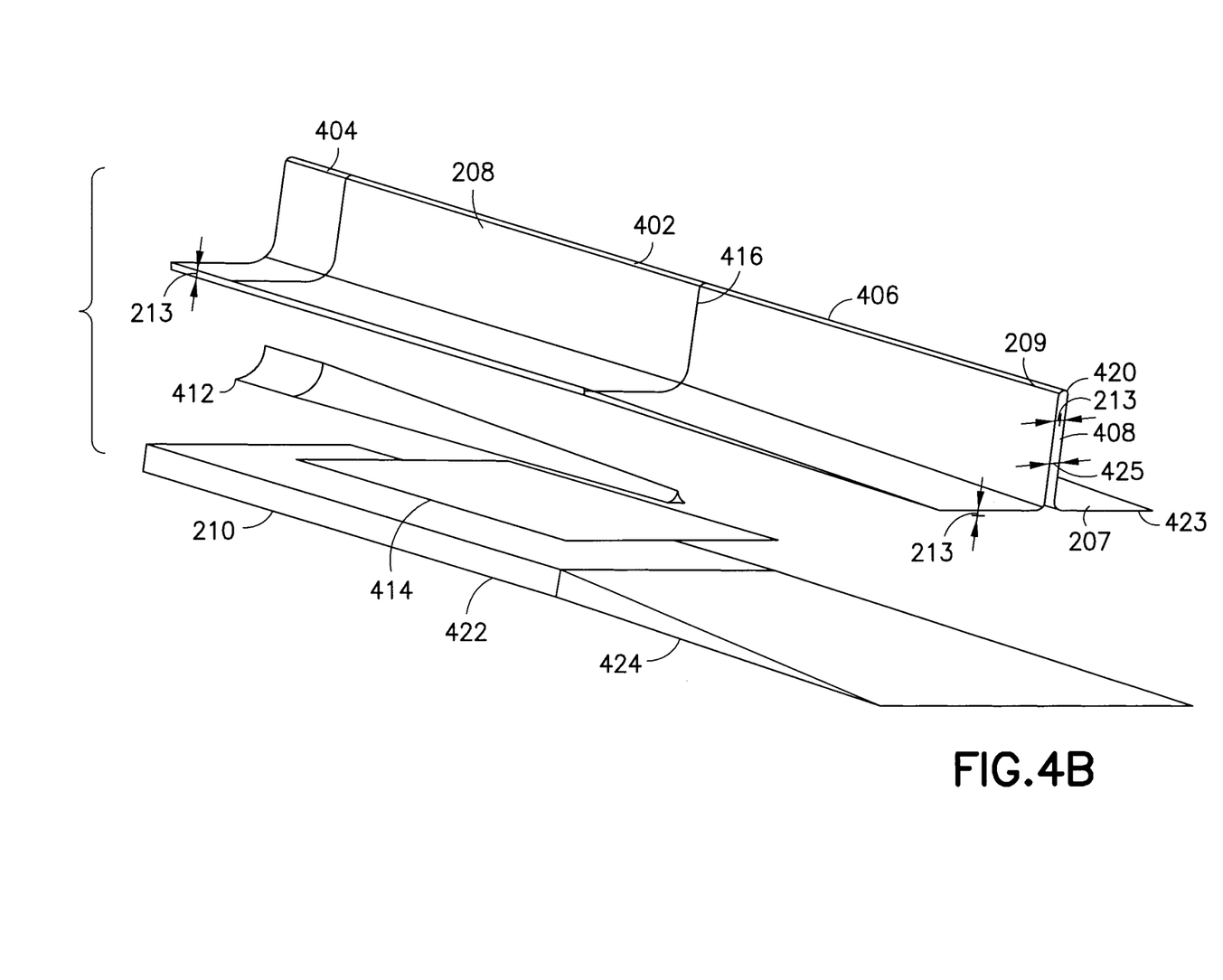
FIG. 4B is a second exploded isometric view of the components of a side-of-body joint shown in FIG. 4A, including a stringer base, a t-shaped stringer section, a stringer noodle and a tapered filler in accordance with an embodiment of the present disclosure.

The shape of the t-shaped stringer sections 208 and the stringer bases 210 will now be described in more detail with respect to FIGS. 4A and 4B, which are exploded views showing t-shaped stringer section 208 and stringer base 210. Two filler elements—a stringer noodle 412 and a tapered filler 414—are also described, and serve to fill spaces not occupied by the other structural elements within the joint 118. For clarity, the cruciform fitting 206 is not shown in these figures.

T-shaped stringer section 208 is a t-shaped member located within wing sections 106, 108 and central portion 110, and extending from the rib 212 along the length of the wing 106 and central portion 110. T-shaped stringer section 208 is not continuous through the wing 106 and central portion 110—rather, different t-shaped stringer sections 208 meet at joint 118. The t-shaped stringer section 208 is an elongated t-shaped member with a horizontal portion 207 and a vertical portion 209 extending up from the horizontal portion 207. The t-shaped stringer section 208 may be manufactured by folding a flat sheet of base material (a "wall" 423) into the "T" shape shown in the figures. The t-shaped stringer section 208 has a wall thickness 213, which is the thickness of the wall 423 in the horizontal portion 207 and the vertical portion 209. The wall thickness 213 may vary along the length of the t-shaped stringer section 208 as described below.

Each t-shaped stringer section 208 has three lengthwise sections, each characterized by different cross-sectional characteristics. Note that the t-shaped stringer section 208 is continuous and that there are no physical breaks between the three lengthwise sections. The sections are simply differentiated based on varying cross-sectional characteristics. The first lengthwise section is a main section 404, which extends the length of the t-shaped stringer. Note that the main section 404 in FIGS. 4A and 4B is depicted as very short for purposes of clarity. However, it is contemplated that the main section 404 will extend the entire length of the wing section 106 or center section 110 of the aircraft. The main section 404 of the t-shaped stringer section 208 may vary in thickness and height along its length. These thickness and height variations are not a part of the teachings of this disclosure. They exist due to the necessity of accommodating structural requirements which may differ along the length of the wing sections. A middle section 402 of the t-shaped stringer section 208 extends between the main section 404 and a terminal section 406 of the t-shaped stringer section.

The terminal section 406 is tapered such that the wall thickness 213 of the terminal section 406 decreases to zero along its length. As can be seen in FIG. 4A, the wall thickness 213 at a distal end 421 is greater than the wall thickness 213 at a proximal end 420. The wall thickness 213 at the distal end 421 is large enough that the folded sections of the wall 423 are adjacent to each other within the vertical portion 209 at distal end 421. However, as can be seen in FIG. 4B, the wall thickness 213 at the proximal end 420 is much thinner, such that there is a lengthwise gap 408 defined between two sections of the wall 423 within the vertical portion 209 at the proximal end 420. This change in wall thickness 213 of wall 423 occurs within terminal section 406 and is gradual.

The lengthwise gap 408 has a gap thickness 425 which gradually decreases with distance from the proximal end 420. The lengthwise gap 408 decreases in thickness to zero, such that no lengthwise gap is present within the middle section 402 or main section 404. In the joint 118, the lengthwise gaps 408 in the t-shaped stringer sections 208 receive the vertical fitting portion 308 of the t-shaped fitting extensions 302 of the cruciform fitting 206.

T-shaped stringer section 208 also defines a noodle gap 410 which runs along the length of the t-shaped stringer section 208 within the main section 404 and the middle section 402. Noodle gap 410 is an artifact of the process used to manufacture t-shaped stringer section 208. This gap 410 exists because the stringer section 208 is bent into the shape shown in the figures. In the assembled joint 118 depicted in FIG. 2, the space left by gap 410, which is present between the stringer base 210 and the t-shaped stringer section 208, is occupied by stringer noodle 412. As can be seen, the cross-sectional shape of stringer noodle 412 remains approximately constant within the main section 404, but decreases in size within the middle section 402. This decrease in cross section exists to match a corresponding decrease in cross-section of the noodle gap 410. There is no stringer noodle 412 within the terminal section 406, as this is space which is to be occupied by the cruciform fitting, which is not depicted in FIG. 4A or 4B.

A wedge-shaped tapered filler 414 is present as well. The tapered filler 414 occupies a space which is created due to the stringer section 208 being angled slightly upward from the base 210 in the assembled joint 118. This slight upward angle helps form the splice joint depicted in FIGS. 2A-2C by allowing the cruciform fitting 206 to be sandwiched between the stringer section 208 and base 210, as described in further detail below and as depicted in FIGS. 2A-2C. A wedge shaped gap is present because for manufacturing reasons, the cruciform fitting is not manufactured such that its thickness decreases to zero. Several reasons for this exist, including the fact that it is difficult to machine titanium to have a zero-thickness edge, and that even if this were done, such a piece of titanium would be dangerous to handle. A gap therefore exists past the titanium fitting. The tapered filler 414 fills this gap. Note that in the assembled joint, the tapered filler 414 has a thickness which is greater closer to the rib 212 than farther away from the rib 212.

The stringer base 210 has a main portion 422 and a terminal portion 424. The thickness of stringer base 210 decreases towards the proximal end 420 of the t-shaped stringer section 208, within the terminal portion 424, as can be seen in both FIGS. 4A and 4B. The width of the stringer base 210 increases towards the proximal end 420 of the t-shaped stringer section 208, within the terminal portion 424.

Referring back to FIGS. 2A-2C, the composition of joint 118 will now be described in more detail. Rib 212 may be fastened to the fuselage through the use of bolts, rivets or other suitable means. The side-of-body rib 212 has a rib web 214 extending approximately parallel to the surface of the fuselage. The rib 212 may have other structural components, such as vertical stiffeners 216, horizontal stiffeners 218 coupled to rib web 214, and other parts not shown in FIGS. 2A-2C.

The cruciform fitting 206 may be coupled to the rib web 214 through the use of fasteners, which may be coupled through holes in the central rib attachment member 304 of the cruciform fitting 206, the rib web 214 and at some locations, through vertical stiffeners 216 as shown.

A bonded connection between the cruciform fitting 206, t-shaped stringer section 208, stringer base 210 and skin 220 is made between these components 206, 208, 210 within a lengthwise area referred to as "transition section" 222. As can be seen, t-shaped fitting extension 302 (which is a part of the cruciform fitting 206) is sandwiched between t-shaped stringer section 208, and stringer base 210. A vertically extending stringer attachment portion 308 (seen in FIG. 3) extends up from a horizontal fitting portion 306 of the t-shaped fitting extension 302 (seen in FIG. 3) and extends into a lengthwise gap 408 (seen in FIGS. 4A and 4B) present within the t-shaped stringer section 208. The joint described above may be referred to herein as a "splice." A continuous skin section 220 is coupled to the cruciform fitting 206 and stringer base 210.

Each transition section 222 has a proximal end 224 at or near the rib 212 and a distal end 226 away from the rib 212. The thickness of the t-shaped fitting extensions 302, stringer base 210 and t-shaped stringer 208 vary within the transition sections 222. Specifically, both the t-shaped stringer 208 and the stringer base 210 decrease in thickness from the distal end 226 of the transition section 222 to the proximal end 224 of the transition section 222, while the t-shaped fitting extensions 302 decrease in thickness from the proximal end 224 to the distal end 226 of the transition section 222. The thickness of the stringer base 210 and t-shaped stringer are substantially uniform outside of the transition sections, although they may vary somewhat to accommodate structural needs. These thickness variations are outside the scope of this disclosure. The t-shaped fitting extensions 302 terminate at or near the distal end 226 of the transition section 222 and are not present outside of the transition section 222. The interface within the transition section 222 thus comprises interlocking portions of cruciform fitting 302, t-shaped stringer portion 208 and stringer base 210. As can be seen, the variations in thickness creates a diagonal interface line 211 between the cruciform fitting 206 and the stringer base 210 apparent in FIGS. 2A-2B.

The thickness variations within the transition area allows the cruciform fitting 206, which is thick near the rib 212, and thus has a large amount of material, to bear most of the load near the rib 212, to gradually permit the stringer 208 and stringer base 210 to pick up that load farther from the rib, and to provide a strong interleaved joint comprising sandwiched layers of stringer base 210, t-shaped fitting extension 302, and t-shaped stringer 208 which are tapered in alternating directions.

Preferably, the t-shaped stringer portion 208 has a stiffness which is less than the stiffness of the stringer base 210. This permits the t-shaped stringer portion 208 to be contoured to a required shape, while allowing the combination of the t-shaped stringer portion 208 and stringer base 210 to have a required stiffness. If the stringer portion 208 and base 210 are made of composite materials, this difference in stiffness may be facilitated by aligning fibers within the base 210 to a direction substantially parallel to the length of the base 210 and aligning the fibers of the t-shaped stringer portion 208 at approximately a 45 degree angle with respect to its length. Other known methods of varying stiffness are possible.

Cruciform fitting 206 is preferably bonded to the skin 220, stringer sections 208 and stringer bases 210. To facilitate creation of the bonded joint, it is contemplated that the t-shaped stringers 208, the stringer bases 210 and skin 220 will be made of a composite material such as carbon fiber pre-impregnated composite, braided composites, fiberglass, or composites having high stiffness fibers such as boron or silicon carbide for compression dominated applications, or other appropriate composite materials, while the cruciform fitting 206 will be a high strength-to-weight material such as titanium or titanium alloys, or stainless steel, including austenitic nickel-chromium based superalloys of stainless steel, such as Inconel brand stainless steel, available from Special Metals Corporation of New Hartford, N.Y., USA. Other materials exhibiting the required characteristics, such as strength properties and ability to be incorporated into a bonded joint, may be used.

Structural bonds between the composite parts are formed when the parts are laid up and cured. The resin within composite parts that interface with each other will combine and cross link during cure to form a structural bond. Between the cruciform fitting and the composite parts, a layer of adhesive is used to form a bond.

One preferred method of manufacturing the joint will now be described. The aircraft skin 220 is laid up. The t-shaped stringer sections 208 are laid up. The stringer bases 210 are laid up and placed on the skin 220. The cruciform fitting 206 is laid up on the stringer bases 210. Layers of adhesive may be applied on all appropriate surfaces of the cruciform fitting 206 to facilitate creation of a bond with the other parts. The tapered fillers, including wedge shaped tapered filler 414 and stringer noodle 212 are laid up on the stringer base 210 and aligned adjacent to the cruciform fitting 206. The t-shaped stringer section 208 is placed on top of the stringer base 210 and the cruciform fitting 206. A vacuum bag is applied and the assembly is cured in an autoclave. Disbond arrest fasteners 228 inserted through t-shaped stringers 208, stringer bases 210 and cruciform fitting 206 within transition section 222 may be utilized to prevent disbond. The resulting cured, bonded assembly may be referred to as "co-cured." Other methods of bonding the various components together may be utilized and are collectively included in the definition of the term "co-cured." In these other methods, one or more of the composite components may be pre-cured or partially cured prior to laying up and curing the entire assembly. For example, the skin 220 may be laid up and cured, and then the entire assembly including the skin 220 may be laid up and cured. A pre-cured or partially cured component may be adhesively bonded to any uncured component and to the cruciform fitting 206 in an autoclave cure, or using any other heated vacuum bag cure method.

Note that in the exemplary joint 118 depicted herein, and unlike in traditional joints discussed above, the rib web 214 is not integrally formed with an "outer chord" (a flat member perpendicular to the ends of the rib web 214) at the location of the cruciform fittings 206. Instead, cruciform fitting 206, which is coupled to the rib web 214, acts like a portion of an outer chord of the rib 212, in the sense that it provides attachment points for structural elements of the wing section, including stringer bases 210, t-shaped stringer sections 208 and skin 220, and that those attachment points are located on surfaces perpendicular to the rib web. A plurality of cruciform fittings 206 placed side by side in a side of body joint therefore acts like a "segmented outer chord," where the plurality of cruciform fittings 206 are the segments of the outer chord. The bonding of the cruciform fitting 206 to the skin 220, t-shaped stringer sections 208 and stringer bases 210, as well as the utilization of a continuous skin section 220, removes the requirement for fasteners inserted through multiple skin sections, and removes the requirement for a large padup of skin layers.

Additionally, the use of a fitting 206 in a material such as metal allows a small radius transition at the joint. This is because metal as a material has the same strength in all directions, whereas composite materials have a lower strength in a direction out of the plane of the fibers of the composite material than within the plane of the fibers of the composite material. Since the change in direction at the side of body joint occurs out of the plane of the fibers of the composite material, use of a metal fitting 206 (or another material with similar properties—that is, having the same strength in all directions) allows a much smaller radius transition at the joint than usage of composite materials.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include all embodiments falling within the scope of the appended claims.

We claim:

1. A side-of-body joint assembly, comprising:
   first and second t-shaped stringers, each having a horizontal stringer portion and a vertical stringer portion extending up from said horizontal stringer portion, said vertical stringer portion defining a lengthwise gap having an opening at said horizontal stringer portion; and
   a cruciform fitting having a central rib attachment member and first and second t-shaped fitting extensions extending in opposite directions from said central rib attachment member, each fitting extension having a horizontal fitting portion and a stringer attachment portion extending up from said horizontal fitting portion;
   said stringer attachment portions of said first and second t-shaped fitting extensions being inserted into said lengthwise gap of said first and second t-shaped stringers, respectively.

2. The side-of-body joint assembly of claim 1, further comprising:
   a disbond arrest fastener fastened through said vertical stringer portions of said first and second t-shaped stringers and through said stringer attachment portions of said first and second t-shaped fitting extensions.

3. The side-of-body joint assembly of claim 1, wherein:
   the horizontal fitting portion has diagonal edges such that a width of the horizontal fitting portion is greater closer to a bottom surface and smaller near a top surface of the horizontal fitting portion.

4. The side-of-body joint assembly of claim 1, further comprising:
   first and second flat stringer bases coupled to said horizontal stringer portion of said first and second t-shaped stringers, respectively.

5. The side-of-body joint assembly of claim 4, wherein:
   said first and second flat stringer bases have greater stiffness than said first and second t-shaped stringer.

6. The side-of-body joint assembly of claim 4, wherein:
   said first and second t-shaped stringers, said first and second t-shaped fitting extensions, and said first and second flat stringer bases meet within first and second transition areas, respectively;
   each of the t-shaped stringers have a thickness that gradually reduces from a distal end of the transition areas to a proximal end of the transition areas.

7. The side-of-body joint assembly of claim 6, wherein:
   each of the flat stringer bases have a thickness that gradually reduces from said distal end of the transition areas to said proximal end of the transition areas;
   each of the fitting extensions have a thickness that gradually reduces from said proximal end of said transition areas to said distal end of said transition areas; and
   said first and second fitting extensions are sandwiched between said first and second t-shaped stringers and said first and second flat stringer bases within said first and second transition areas, thereby forming a spliced joint.

8. The side-of-body joint assembly of claim 7, further comprising:
   one or more fillers shaped and positioned to occupy voids not occupied by said first and second t-shaped stringers, said first and second flat stringer bases, and said first and second fitting extensions, within said first and second transition areas.

9. The side-of-body joint assembly of claim 4, further comprising:
   a continuous skin section coupled to said first and second stringer bases and to said cruciform fitting.

10. The side-of-body joint assembly of claim 9, wherein:
    said first and second t-shaped stringers, said first and second flat stringer bases, said skin section and said cruciform fitting are co-cured.

11. A side-of-body joint assembly coupled to a rib web having a plurality of vertical stiffeners, said side of body joint assembly comprising:
    first and second t-shaped stringers, each having a horizontal stringer portion and a vertical stringer portion extending up from said horizontal stringer portion, said vertical stringer portion defining a lengthwise gap having an opening at said horizontal stringer portion; and
    a cruciform fitting having a central rib attachment member and first and second t-shaped fitting extensions extending in opposite directions from said central rib attachment member, each fitting extension having a horizontal fitting portion and a stringer attachment portion extending up from said horizontal fitting portion;
    said stringer attachment portions of said first and second t-shaped fitting extensions being inserted into said lengthwise gap of said first and second t-shaped stringers, respectively;
    said central rib attachment member being coupled to said rib web.

12. The side-of-body joint assembly of claim 11, wherein:
    said central rib attachment member is coupled to said rib web through the use of a fasteners; and
    said fastener extends through said central rib attachment member, at least one of said plurality of vertical stiffeners and said rib web.

13. The side-of-body joint assembly of claim 11, wherein:
    said cruciform fitting is titanium.

14. The side-of-body joint assembly of claim 11, further comprising:
    first and second flat stringer bases coupled to said horizontal stringer portion of said first and second t-shaped stringers, respectively.

15. The side-of-body joint assembly of claim 14, further comprising:
    a continuous skin section coupled to said first and second stringer bases and to said cruciform fitting;
    said first and second t-shaped stringers, said first and second flat stringer bases, said skin section and said cruciform fitting being co-cured.

16. An aircraft having a side-of-body joint, said side of body joint comprising:
    a rib web; and
    a plurality of side of body joint assemblies arranged side by side, each side of body joint assembly comprising:

first and second t-shaped stringers, each having a horizontal stringer portion and a vertical stringer portion extending up from said horizontal stringer portion, said vertical stringer portion defining a lengthwise gap having an opening at said horizontal stringer portion; and a cruciform fitting having a central rib attachment member and first and second t-shaped fitting extensions extending in opposite directions from said central rib attachment member, each fitting extension having a horizontal fitting portion and a stringer attachment portion extending up from said horizontal fitting portion;

said stringer attachment portions of said first and second t-shaped fitting extensions being inserted into said lengthwise gap of said first and second t-shaped stringers, respectively;

each of said central rib attachment members of said plurality of side of body joint assemblies being coupled to said rib web; and the cruciform fittings of the plurality of side of body joint assemblies arrayed to form a segmented outer chord of a side of body rib.

17. The aircraft of claim 16, wherein:

each of said cruciform fittings is titanium.

18. The aircraft of claim 16, further comprising:

a plurality of vertical stiffeners arranged side by side and coupled to said rib web.

19. The aircraft of claim 18, wherein:

each of said central rib attachment members of said plurality of side of body joint assemblies is coupled to said rib web through the use of a plurality of fasteners; and one of said plurality of fasteners extends through a central rib attachment member, one of said plurality of vertical stiffeners and said rib web.

20. The aircraft of claim 19, further comprising:

a continuous skin coupled to the said plurality of side of body joint assemblies;

said first and second t-shaped stringers of each side of body joint assembly, said first and second flat stringer bases of each side of body joint assembly, said cruciform fitting of each side of body joint assembly and said skin section being co-cured.

\* \* \* \* \*